US011211781B2

(12) United States Patent
Batko et al.

(10) Patent No.: US 11,211,781 B2
(45) Date of Patent: *Dec. 28, 2021

(54) GROUND FAULT CIRCUIT INTERRUPTER USING FREQUENCY RECOGNITION AND MEASUREMENT

(71) Applicant: Hubbell Incorporated, Shelton, CT (US)

(72) Inventors: Thomas James Batko, Wallingford, CT (US); Joseph Michael Meady, Stratford, CT (US)

(73) Assignee: Hubbell Incorporated, Shelton, CT (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/748,229

(22) Filed: Jan. 21, 2020

(65) Prior Publication Data

US 2020/0161849 A1 May 21, 2020

Related U.S. Application Data

(63) Continuation of application No. 15/340,269, filed on Nov. 1, 2016, now Pat. No. 10,541,526.

(Continued)

(51) Int. Cl.
*H02H 3/00* (2006.01)
*H02H 3/16* (2006.01)
(Continued)

(52) U.S. Cl.
CPC ............... *H02H 3/16* (2013.01); *H02H 3/04* (2013.01); *H02H 3/044* (2013.01); *H02H 3/07* (2013.01);
(Continued)

(58) Field of Classification Search
None
See application file for complete search history.

(56) References Cited

U.S. PATENT DOCUMENTS 5,477,412 A 12/1995 Neiger
6,421,214 B1 7/2002 Packard et al.
(Continued)

OTHER PUBLICATIONS

PCT/US2016/059867 International Search Report and Written Opinion dated Jan. 19, 2017.
EP16862782.6 Extended European Search Report dated Jun. 7, 2019.

*Primary Examiner* — Stephen W Jackson
(74) *Attorney, Agent, or Firm* — Michael Best & Friedrich LLP (57) ABSTRACT

A wiring device including an interrupting device, a fault detection circuit, and a testing circuit. The interrupting device is electrically connecting one or more line terminals to one or more load terminals. The fault detection circuit is configured to detect a fault condition and generate a fault detection signal in response to detecting the fault condition. The fault detection signal being provided to the interrupting device to place the interrupting device in a tripped condition. The testing circuit is configured to determine a frequency of an input voltage at the one or more line terminals, filter the frequency of the input voltage, determine whether the filtered frequency is within a predetermined range, and when the filtered frequency is within the predetermined range, perform a test of the wiring device.

20 Claims, 10 Drawing Sheets

Related U.S. Application Data

(60) Provisional application No. 62/250,273, filed on Nov. 3, 2015.

(51) Int. Cl.
*H02H 3/33* (2006.01)
*H02H 3/04* (2006.01)
*H02H 3/46* (2006.01)
*H02H 3/07* (2006.01)

(52) U.S. Cl.
CPC ............ *H02H 3/162* (2013.01); *H02H 3/334* (2013.01); *H02H 3/335* (2013.01); *H02H 3/46* (2013.01)

(56) References Cited

U.S. PATENT DOCUMENTS

| | | |
|---|---|---|
| 7,253,629 B1 | 8/2007 | Richards |
| 9,118,174 B2 | 8/2015 | Simonin |
| 10,541,526 B2 * | 1/2020 | Batko .................... H02H 3/07 |
| 2006/0125622 A1 | 6/2006 | Baldwin et al. |
| 2007/0035898 A1 | 2/2007 | Baldwin et al. |
| 2010/0013491 A1 | 1/2010 | Hooper et al. |
| 2013/0229734 A1 | 9/2013 | Beck et al. |
| 2014/0268434 A1 | 9/2014 | Simonin |
| 2014/0347768 A1 | 11/2014 | Batko et al. |

\* cited by examiner

GROUND FAULT CIRCUIT INTERRUPTER USING FREQUENCY RECOGNITION AND MEASUREMENT

RELATED APPLICATIONS

The present application claims priority to U.S. patent application Ser. No. 15/340,269, filed Nov. 1, 2016, which claims priority to U.S. Provisional Application No. 62/250,273, filed Nov. 3, 2015, the entire contents of both of which are hereby incorporated.

BACKGROUND

The present application relates generally to switched electrical devices. More particularly, the present application is directed to circuit interrupting devices, such as ground fault circuit interrupter (GFCI) devices, that switch to a "tripped" or unlatched state from a "reset" or latched state when one or more conditions are detected. Such devices consistent with embodiments of the application disclosed herein are more reliable than previously known GFCI devices.

SUMMARY

To be commercially sold in the United States a GFCI device must conform to standards established by the Underwriter's Laboratory (UL) in conjunction with industry-leading manufacturers as well as other industry members, such as various safety groups. One UL standard covering GFCI devices is UL-943 (http://ulstandards.ul.com/standard/?id=943), entitled "Standard for Safety—Ground Fault Circuit Interrupters." UL-943 applies to Class A, single-phase and three-phase GFCIs intended for protection of personnel and includes minimum requirements for the function, constructions, performance, and markings of such GFCI devices. UL-943 requires, among other things, specific fault current levels and response timing requirements at which the GFCI device should trip. Typically, GFCIs are required to trip when a ground fault having a level of approximately four-milliamps (mA) to approximately six mA is detected. Additionally, when a high resistance ground fault is applied to the device, UL-943 requires that the device should trip and prevent current from being delivered to the load in accordance with the equation, $T=(20/I)^{1.43}$ where T refers to time and is expressed in seconds(s) and I refers to electrical current and is expressed in mA. Thus, for example, in the case of a 5 mA fault, the device must detect the fault and trip in 7.26 s or less.

Typically, GFCI devices include a TEST button, which when pressed, actuates a simulated ground fault outside the sense core from the load hot to the line neutral conductors. If the device is functioning properly, the simulated fault is detected and the device will trip (i.e., a mechanical interrupter is actuated to open the current path connecting the line side of the device to the load side of the device). Studies performed by industry safety groups have indicated that most users do not regularly test their GFCI device (i.e., by manually pressing the TEST button). As a result, unsafe conditions may occur. Therefore, many GFCI devices are now operable to perform self-tests and auto-monitor themselves without the need for human intervention. Such self-tests and auto-monitoring operations must not interfere with the primary function of the device (i.e., supply power and nip when an actual fault is encountered). Typically, such self-tests are operated with the assumption the GFCI device is receiving an AC input having a constant 60 Hz frequency. However, when the frequency of the AC input (e.g., AC input from a power generator, invertor applications, and the like) is not constant, such self-tests may be unreliable and may also result in unnecessary trips of the GFCI device. Furthermore, the AC input may include noise, which further causes unreliability in the self-tests and unnecessary trips of the GFCI device.

Thus, to cure the deficiencies of known GFCI devices, in one embodiment, the application provides a wiring device including an interrupting device, a fault detection circuit, and a testing circuit. The interrupting device electrically connects one or more line terminals to one or more load terminals when the interrupting device is in a reset condition and disconnecting the line terminals from the load terminals when the interrupting device is in a tripped condition. The fault detection circuit is configured to detect a fault condition and generate a fault detection signal in response to detecting the fault condition. The fault detection signal being provided to the interrupting device to place the interrupting device in the tripped condition. The testing circuit is configured to determine a frequency of an input voltage at the one or more line terminals, filter the frequency of the input voltage, determine whether the filtered frequency is within a predetermined range, and when the filtered frequency is within the predetermined range, perform a test of the wiring device.

In another embodiment the application provides a method of performing a self-test of a wiring device. The method includes determining a frequency of an input voltage and filtering the frequency. The method further includes determining whether the filtered frequency of the input voltage is within a predetermined range and when the filtered frequency is within the predetermined range, performing the self-test of the wiring device.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
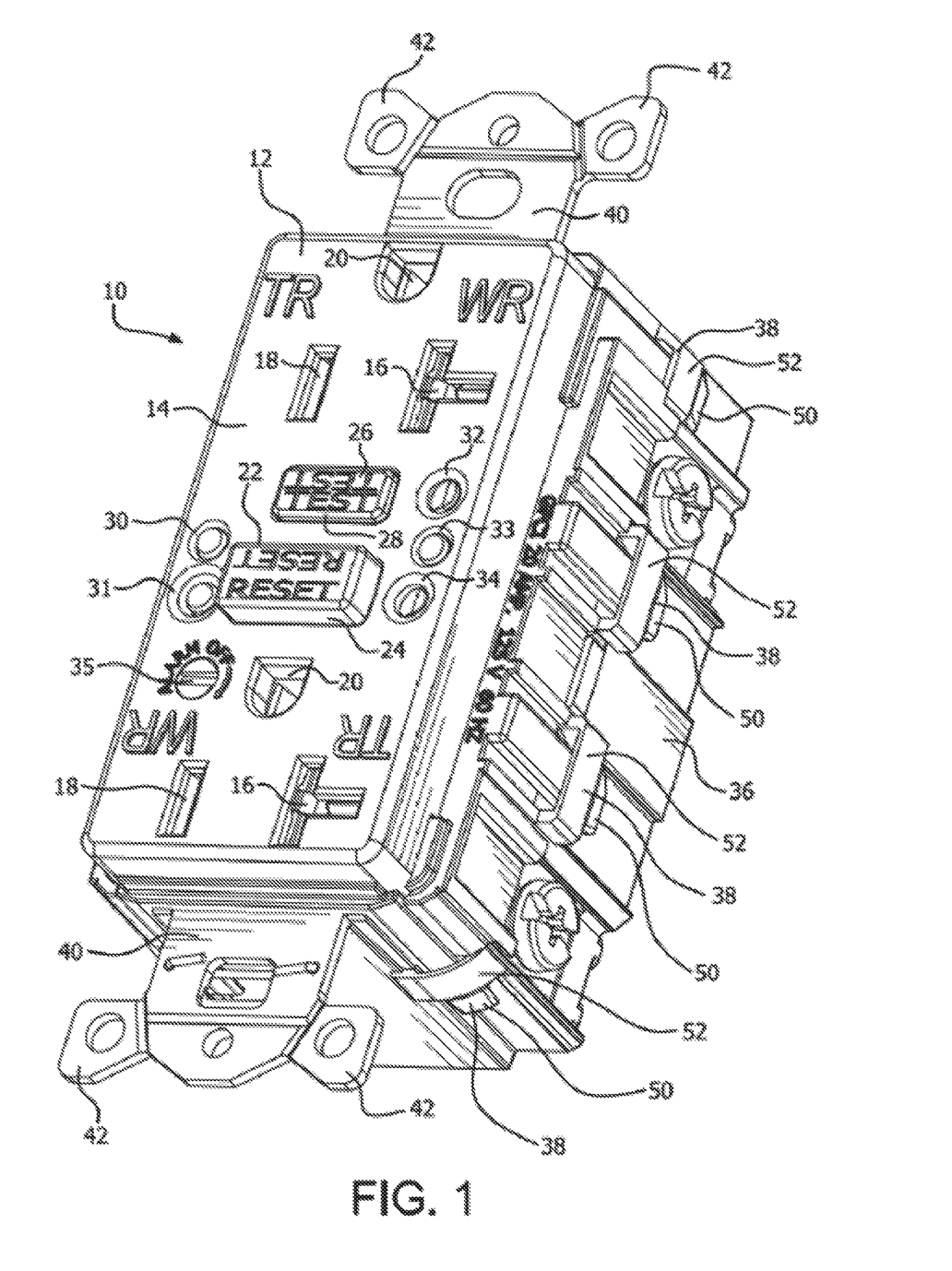
FIG. 1 illustrates a perspective view of a GFCI device, or GFCI receptacle, according to some embodiments of the application.

FIG. 1 illustrates a perspective view of a GFCI device, or GFCI receptacle, 10 according to some embodiments of the application. The GFCI receptacle 10 includes a front cover 12 having a duplex outlet face 14 with a phase opening 16, a neutral opening 18, and a ground opening 20. The face 14 further has opening 22, accommodating a RESET button 24, an adjacent opening 26, accommodating a TEST button 28, and six respective circular openings 30-35. In some embodiments, openings 30 and 33 accommodate two respective indicators, such as but not limited to, various colored light-emitting diodes (LEDs). In some embodiments, openings 32 and 34 accommodate respective bright LEDs used, for example, as a nightlight. In some embodiments, opening 31 accommodates a photoconductive photocell used, for example, to control the nightlight LEDs. In some embodiments, opening 35 provides access to a set screw for adjusting a photocell device or a buzzer (e.g., buzzer 605 described in more detail below) in accordance with this, as well as other, embodiments.

The GFCI receptacle 10 further includes a rear cover 36 secured to the front cover 12 by eight fasteners 38 (four fasteners 38 are shown in FIG. 1, while the other four fasteners 38 are obstructed from view). In some embodiments, the fasteners 38 include a barbed post 50 on the front cover 12 and a corresponding resilient hoop 52 on the rear cover 36, similar to that which is described in detail in U.S. Pat. No. 6,398,594, the entire contents of which are incorporated herein by reference for all that is taught. A ground yoke/bridge assembly 40 includes standard mounting ears 42 protruding from the ends of the GFCI receptacle 10.

Figure 2:
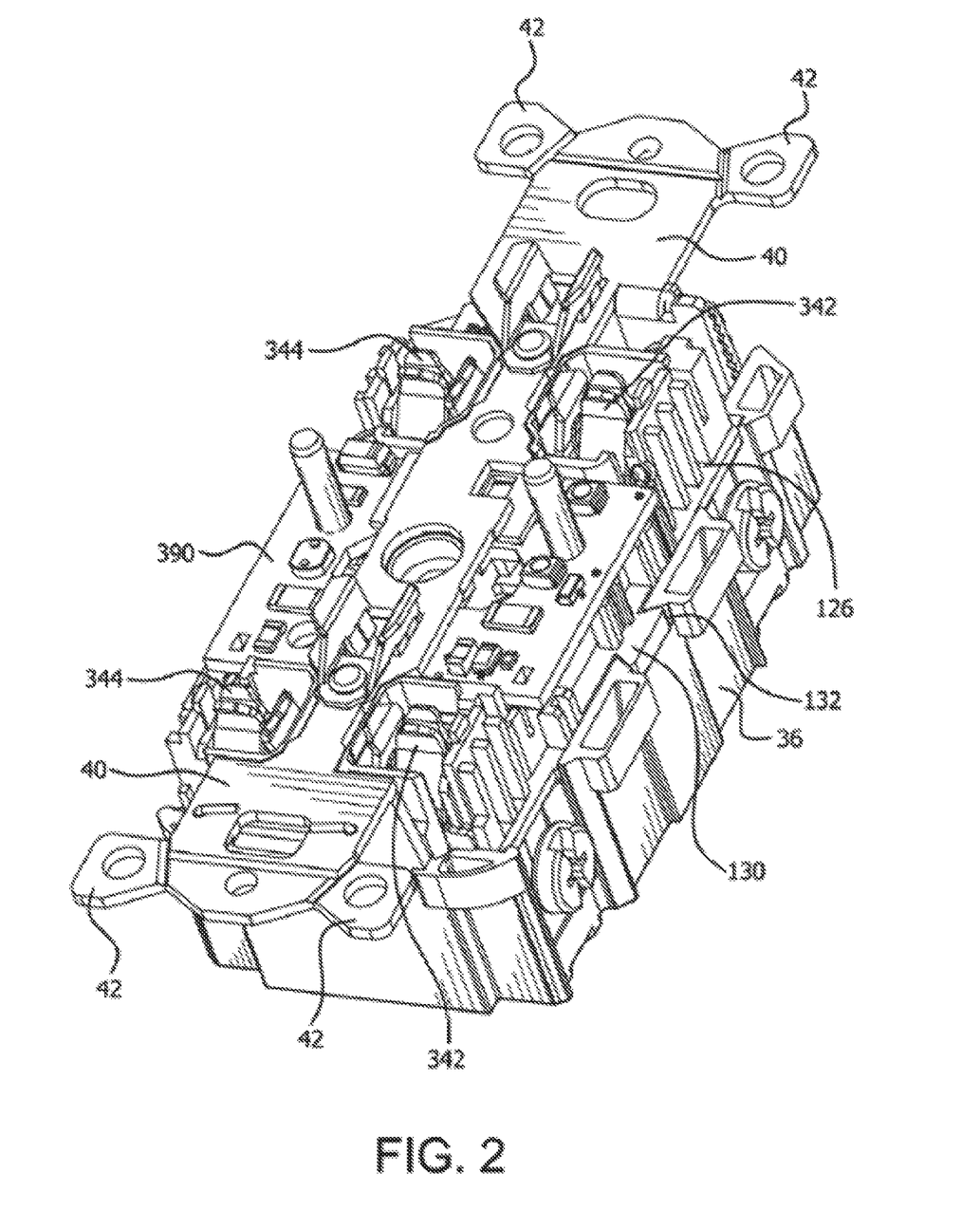
FIG. 2 illustrates a perspective view of the GFCI receptacle of FIG. 1 with a front cover removed in order to expose a manifold, according to some embodiments of the application.

FIG. 2 illustrates a perspective view of the GFCI receptacle 10 with the front cover 12 removed to expose manifold 126. Manifold 126 provides support for a printed circuit board 390 and the yoke/bridge assembly 40. According to one embodiment, manifold 126 includes four dovetail interconnects 130 that mate with corresponding cavities 132 along an upper edge of the rear cover 36. One dovetail-cavity pair is provided on each of the four sides of manifold 126 and rear cover 36, respectively.

Figure 3:
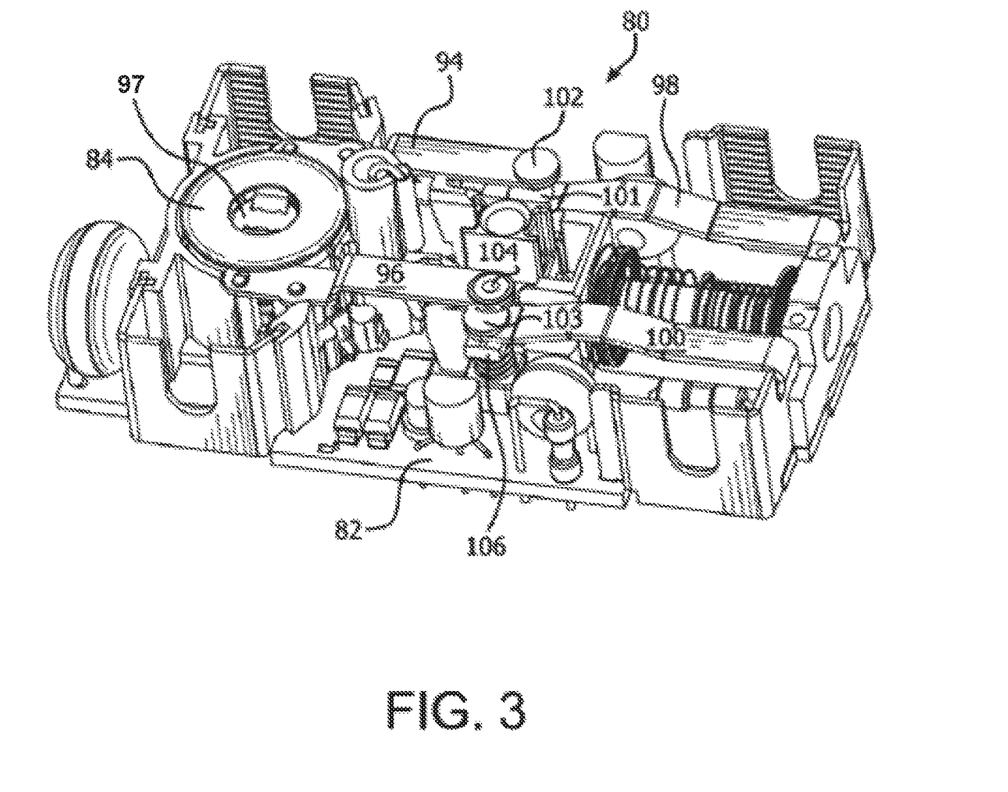
FIG. 3 illustrates a side elevation view of a core assembly of the GFCI receptacle of FIG. 1, according to some embodiments of the application.

FIG. 3 is a side elevation view of a core assembly 80 according to some embodiments. Core assembly 80 includes a circuit board 82 that supports most of the working components of the GFCI receptacle 10, including the circuit shown in FIGS. 4A-4D, which are referred to collectively herein as FIG. 4, as well as a sense transformer 425 (illustrated in FIG. 4) and a grounded neutral transformer 430 (illustrated in FIG. 4). Line contact arms 94, 96 pass through transformers 425, 430 with an insulating separator 97 there between. Line contact arms 94, 96 are cantilevered, their respective distal ends carrying phase and neutral line contacts 102, 104. Load contact arms 98, 100 are also cantilevered with their respective distal ends carrying phase and neutral load contacts 101, 103. The resiliency of the cantilevered contact arms biases the line contacts 102, 104 and load contacts 101, 103 away from each other. Load contact arms 98, 103 rest on a movable contact carriage 106, made of insulating (preferably thermoplastic) material.

Figures 4, 4A:
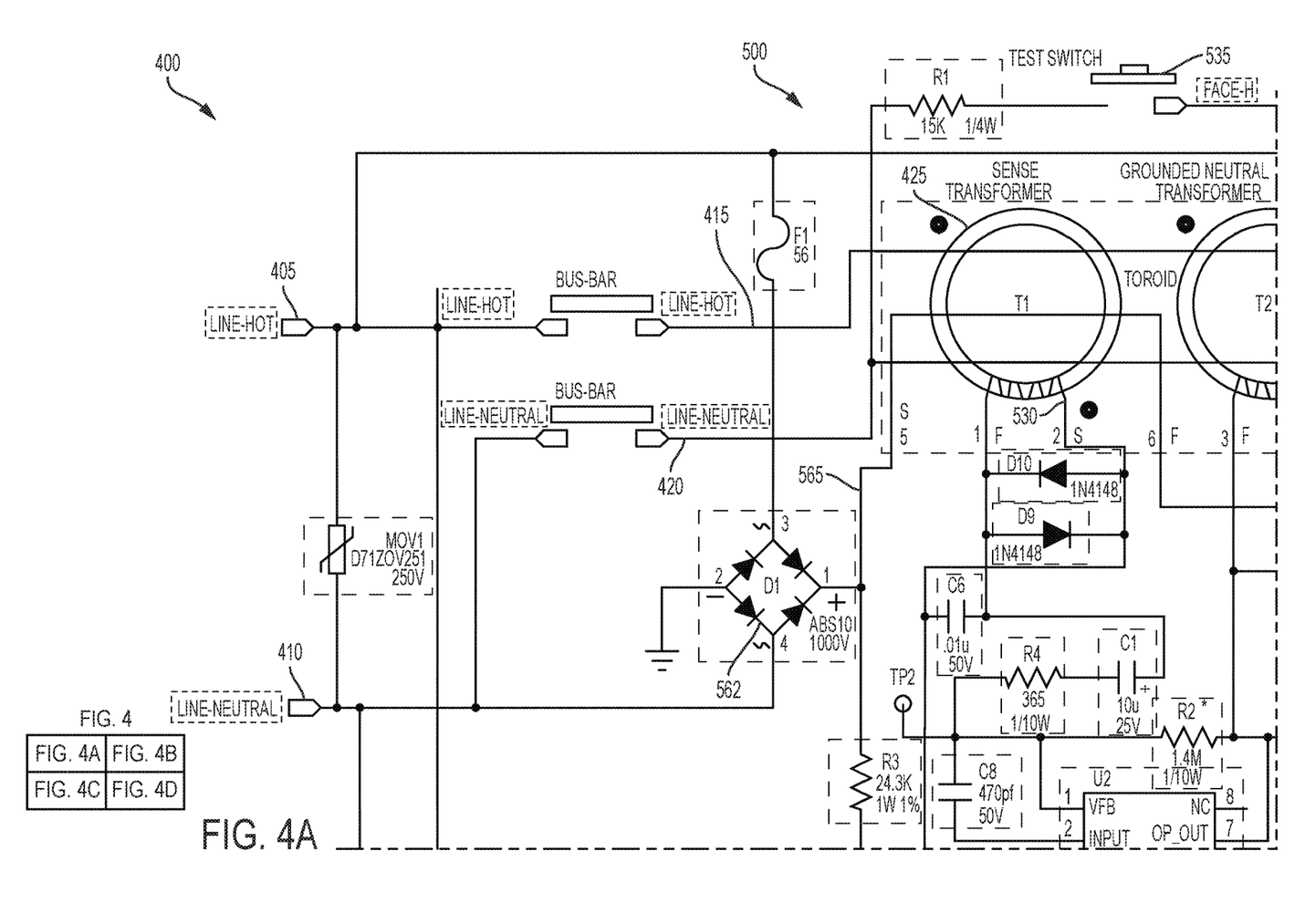
FIGS. 4A-4D illustrates a circuit diagram of a circuit of the GFCI receptacle of FIG. 1, according to some embodiments of the application.
Figure 4B:
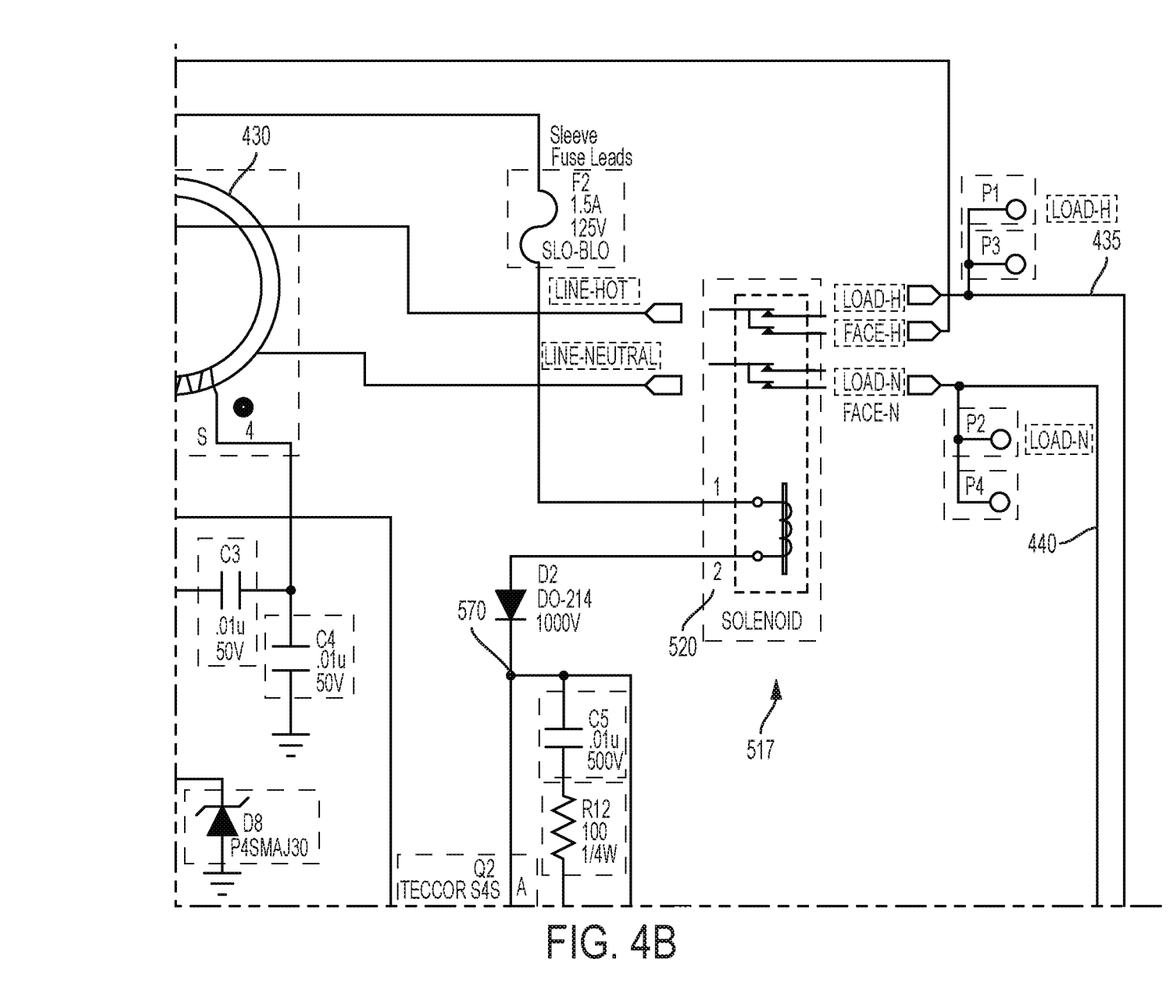
Figure 4C:
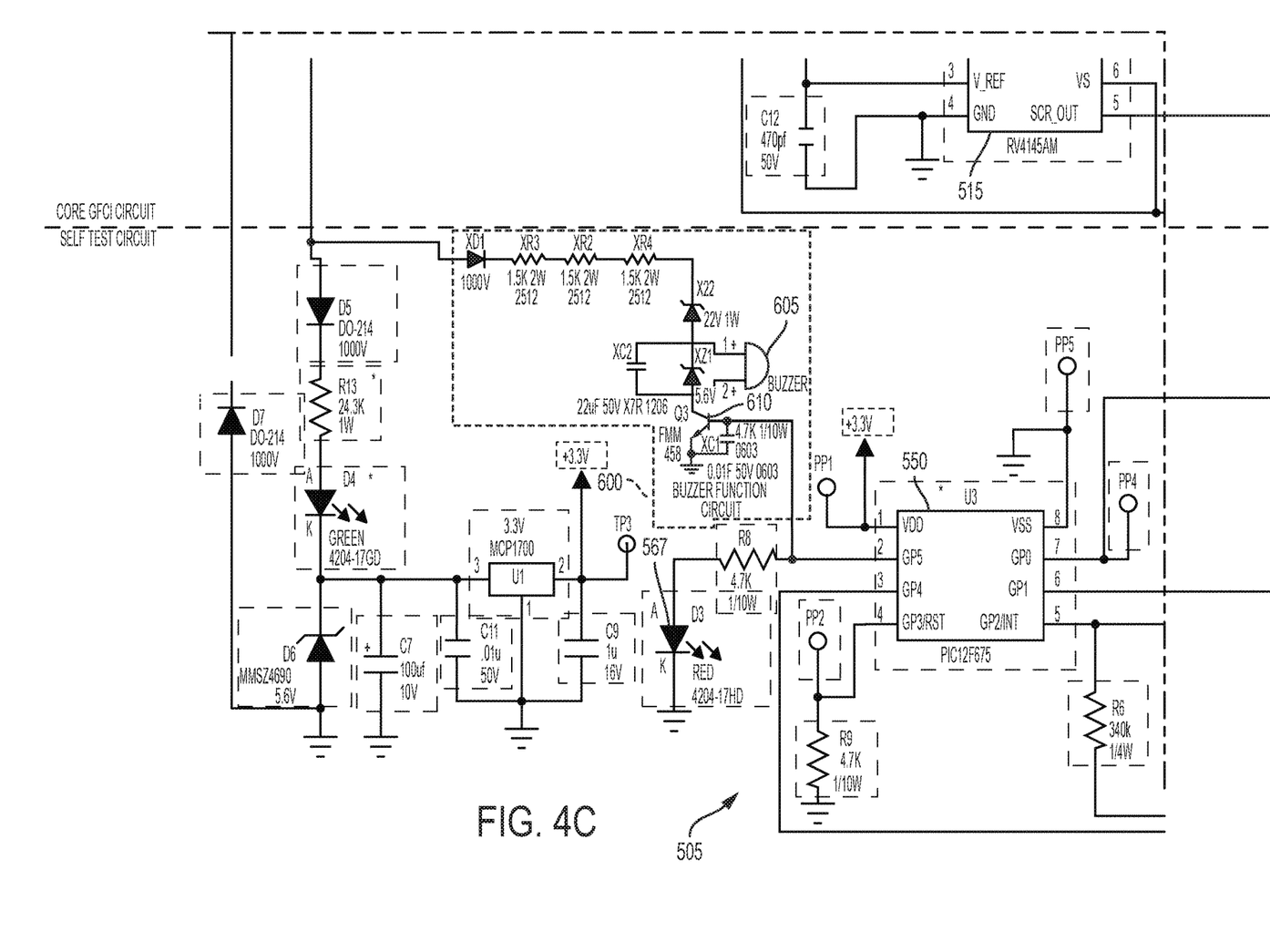
Figure 4D:
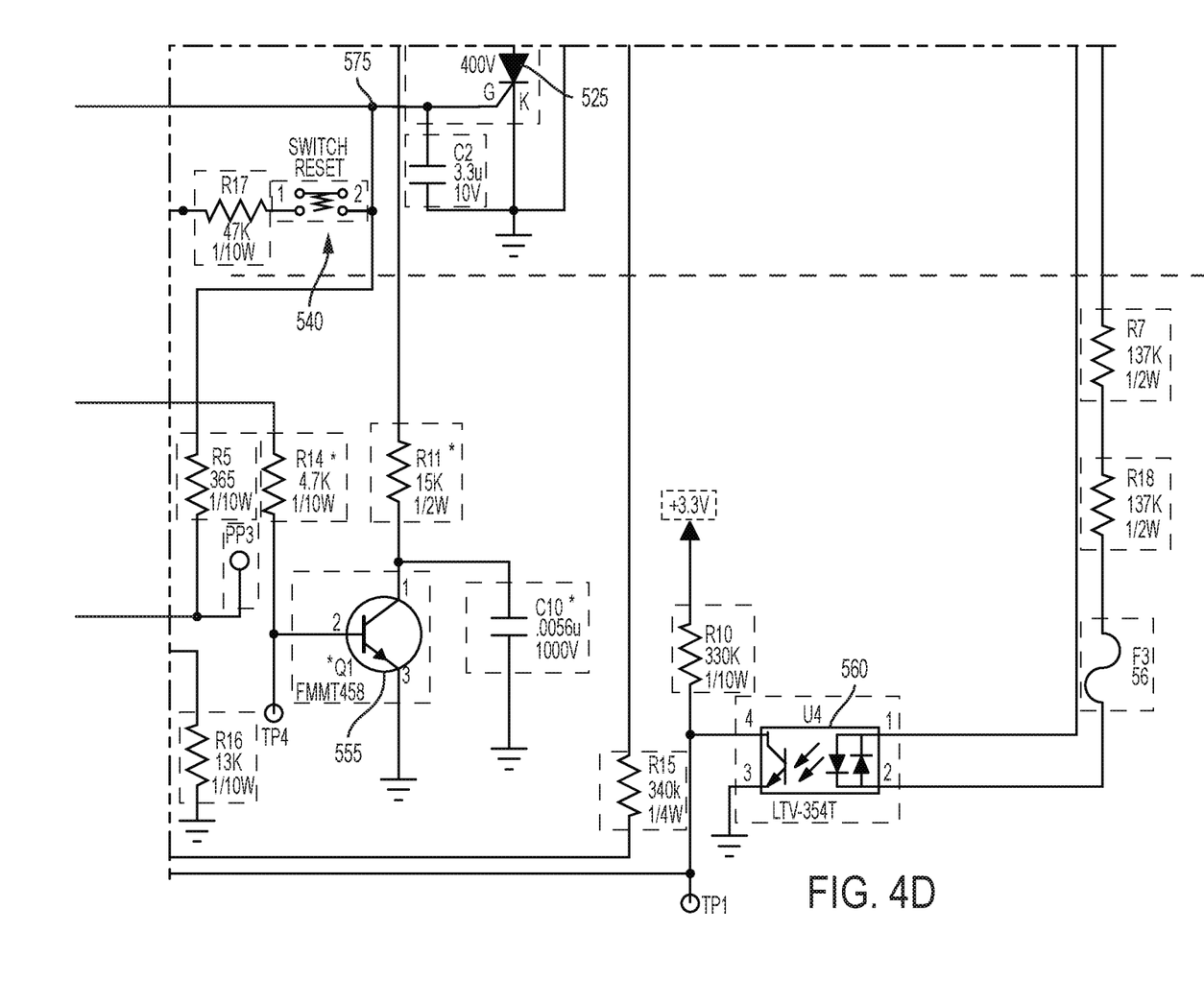

FIG. 4 (FIGS. 4A-4D) is an electrical schematic of a circuit 400 of the GFCI receptacle 10 in accordance with some embodiments of the application. The GFCI circuit 400 includes a phase line terminal 405 and a neutral line terminal 410 for electrical connection to a power source (not shown).

The phase line terminal 405 and the neutral line terminal 410 are configured to receive an input voltage from the power source. In some embodiments, the input voltage is approximately 120V having a frequency of approximately 60 Hz. In other embodiments, the input voltage is within a range of approximately 60V to approximately 180V having a frequency of approximately 25 Hz to approximately 80 Hz. By way of example, the phase line terminal 405 and the neutral line terminal 410 may correspond to input terminals of the GFCI receptacle 10.

The phase line terminal 405 and the neutral line terminal 410 are respectively connected to phase line conductor 415 and neutral line conductor 420. Phase line conductor 415 and neutral line conductor 420 each pass through sense transformer 425 and grounded neutral transformer 430. Phase line conductor 415 and neutral line conductor 420 are further releasably connected to face and load conductors 435, 440. For example, the phase line conductor 415 and neutral line conductor 420 may be releasably connected to face and load conductors 435, 440 via line contacts 102, 104, load contacts 101, 103, and face contacts, discussed above with respect to FIG. 3. GFCI circuit 400 may also include optional phase and load neutral terminals, which electrically connect to a downstream load (not shown), such as one or more additional receptacle devices.

The GFCI circuit 400 includes a detection, or fault detection, circuit 500 and a self-test, or testing, circuit 505. The detection circuit 500 includes, among other things, the sense transformer 425, the ground neutral transformer 430, a detection controller 515, and an interrupting device 517 (e.g., a solenoid 520 and a solenoid switch 525). The detection controller 515 is configured to detect one or more fault conditions, and place the GFCI receptacle 10 in the tripped state when the one or more fault conditions are detected. In some embodiments, the detection controller 515 is a well-known integrated circuit device, such as but not limited to, a 4145 device. In some embodiments, the detection controller 515 is an RV 4145 device made by Fairchild Semiconductor Corporation.

The detection controller 515 receives electrical signals from various other components of the GFCI circuit 400, including the sense transformer 425 and the ground neutral transformer 430, and detects one or more fault conditions, such as a real fault, a simulated fault or self-test ground fault, and a real or simulated grounded neutral fault. In operation, when there is a current imbalance in line conductors 415, 420 a net current flows through transformers 425, 430, causing a magnetic flux to be created about at least the sense transformer 425. The magnetic flux results in electrical current being induced on conductor 530. Conductor 530 is wound around sense transformer 425, with respective ends of conductor 530 being connected to V-REF and: INPUT pins of the detection controller 515. The induced current on conductor 530 causes a voltage difference between the V-REF and INPUT pins. When the voltage difference exceeds a predetermined threshold, the detection controller 515 outputs a control signal. For example, the detection controller 515 outputs a control signal from the SCR_OUT pin.

The current imbalance on line conductors 415, 42.0 results from either a real ground fault, a simulated ground fault, or a self-test ground fault. A simulated ground fault is generated when test switch 535 closes, which occurs when TEST button 28 (FIG. 1) is pressed. As described in further detail below, a self-test ground fault occurs when the self-test circuit 505 initiates a self-test sequence.

According to the present embodiments, when test switch 535 closes, at least some of the current flowing in line conductors 415, 420 and face and load conductors 435, 440 is diverted around sense transformer 425, through resistor R1, and back to neutral line conductor 420. By diverting the current in such a manner, an imbalance is created in the current flowing through the phase line conductor 415 and the current flowing through the neutral line conductor 420. As stated above, such a current imbalance causes a magnetic flux to be created about sense transformer 425, as well as a voltage difference present at the V-REF and INPUT pins that exceeds the predetermined threshold. In response, the detection controller 515 outputs the control signal from the SCR_OUT pin.

The control signal output from the SCR_OUT pin may be used to control the solenoid switch, or switch, 525. In some embodiment, the solenoid switch 525 is a silicon controlled rectifier (SCR) switch having a gate, an anode, and a cathode. In such an embodiment, the control signal is received at the gate of the switch 525. When the control signal is received at the gate of the solenoid switch 525, the solenoid switch 525 is activated and current is allowed to flow between the anode and the cathode of the solenoid switch 525. When the solenoid switch 525 is activated, current flows from phase line conductor 415 through the solenoid 520. When current flows through solenoid 520, a magnetic field is generated that moves an armature within solenoid 520. When the solenoid armature moves, it unlatches a contact carriage (e.g., movable contact carriage 106 of FIG. 3) and the carriage drops under a natural bias of line conductors 415, 420 away from the face and load conductors 435, 440. The GFCI receptacle 10 is now in the tripped condition, as a result of the successful manually simulated ground fault. When in the tripped condition, the GFCI receptacle 10 will not deliver power to a load until it is reset.

Manual testing via the reset operation may also be performed on the GFCI receptacle 10 by pressing the RESET button 24 (FIG. 1). Pressing the RESET button 24 closes reset switch 540. By closing reset switch 540, a voltage supply output pin VS of the detection controller 515 is electrically connected to the solenoid switch 525. Thus the solenoid switch 525 receives a voltage from the VS pin, the solenoid switch 525 activates in a similar fashion as when receiving the control signal from the SCR_OUT pin. Likewise, similar to the simulated ground fault discussed above, when solenoid switch 525 is activated, solenoid 520 is activated.

However, when reset switch 540 closes, the GFCI receptacle 10 is most likely already in the tripped condition (i.e., the contacts of the line, face, and load contacts are electrically isolated from each other). Therefore, the RESET button 24 is pressed to "re-latch" the contact carriage and bring the line, face, and load contacts back into electrical contact after the GFCI receptacle 10 has been tripped.

The self-test circuit 505 is configured to perform self-test and auto-monitoring sequences of the GFCI receptacle 10. The self-test circuit 505 includes, among other things, a self-test controller 550, a self-test switch 555, an opto-isolator 560, and an indicator 567.

As explained in greater detail below, the self-test controller 550 is programmed to implement one or more self-test and auto-monitoring routines, including but not limited to, frequency detection, a ground fault detection self-test, and a solenoid self-test. In some embodiments, the self-test controller 550 is a well-known integrated circuit device, such as but not limited to, a Microchip microcontroller such as, but not limited to, a PIC12F675.

Frequency Measurement

As discussed in more detail below, the self-test controller 550 is operable to perform a ground fault detection self-test and a solenoid self-test of the GFCI receptacle 10. In some embodiments, before the ground fault detection self-test or the solenoid self-test is performed, the self-test controller 550 measures a frequency of the input voltage received by the GFCI receptacle 10. The frequency is measured by counting the number of positive zero crossings of the input voltage over a predetermined time-period (e.g., a two second time period). In order to determine the number of positive zero crossings over the predetermined time-period, the self-test controller 550 monitors node 570 via the GP2/INT pin. The self-test controller 550 then divides the number of positive zero crossings by the predetermined time-period (e.g., two) to calculate the frequency.

In some embodiments, if the frequency is outside of a predetermined range (e.g., approximately 48 Hz to approximately 70 Hz), the self-test controller 550 will hold, and will not perform the ground fault detection self-test and/or the solenoid self-test until the measured frequency is within the predetermined range. In other embodiments, if the frequency is outside of the predetermined range, the self-test controller 550 post-pones the ground fault detection self-test and/or the solenoid self-test until the frequency is within the predetermined range. In some embodiments, if the frequency is determined to be approximately zero Hz, the frequency is re-measured, for example but not limited to, two-seconds later. Re-measurements will occur until the frequency is not equal to zero Hz, or if the frequency is measured to be zero Hz a predetermined amount of additional times in a row. In some embodiments, if the frequency is measured to be equal to zero Hz eight consecutive times, the GFCI receptacle 10 end-of-life (EOL) will be determined.

In some embodiments, the self-test controller 550 performs a filtering operation when determining the frequency. The filtering operation is performed to block out noise of the input voltage. In some embodiments, a low-pass filtering operation is performed. In some embodiments, the frequency is sampled at a predetermined rate (e.g., every 3 ms).

Ground Fault Detection Self-Test

The self-test controller 550 is operable to perform a ground fault detection self-test. In some embodiments, the ground fault detection self-test is performed within a predetermined time of the GFCI receptacle 10 receiving power (e.g., approximately five seconds). The ground fault detection self-test is performed to confirm that the GFCI receptacle 10, and more specifically the detection circuit 500 of the GFCI circuit 400, correctly detects the one or more fault conditions. The ground fault detection self-test is performed at predetermined time intervals (e.g., once every minute). If the ground fault detection self-test is failed, a retest is performed, for example but not limited to, two-seconds later. Retests will occur until the ground fault detection self-test is passed or seven additional failures have occurred. If eight consecutive fails occur, the GFCI receptacle 10 EOL is determined. In other embodiments, EOL may be determined if more or less than eight consecutive fails occur. Yet, in other embodiments, EOL may be determined if more or less than eight non-consecutive fails occur.

In some embodiments, to perform the ground fault detection self-test, the self-test controller 550 initially measures a frequency of the input voltage as described above. After calculating the frequency of the input voltage, the self-test controller 550 outputs a ground fault signal at a predetermined period (e.g., $5/16^{th}$) of the frequency of the input voltage after the input voltage has crossed the positive zero (i.e., during the negative half-cycle of the input voltage). In other embodiments, the self-test controller 550 may output the ground fault signal at any period of the frequency of the input voltage. The ground fault signal is output from the GP0 pin to the self-test switch 555. In some embodiments, the self-test switch 555 is a transistor, such as but not limited to a BJT semiconductor. In some embodiments, the ground fault signal is output for a predetermined duration (e.g., approximately eight-milliseconds) or until a predetermined voltage (e.g., approximately 190 mV) is measured at node 575 via the GP1 pin of the self-test controller 550.

Upon receiving the ground fault signal, the self-test switch 555 is activated. When the self-test switch 555 is activated, current is allowed to flow, through a rectifier 562, on conductor 565. As illustrated, current flowing on conductor 565 will flow through sense transformer 425. Similar to the manually simulated ground fault discussed above, in normal operation, the current flowing through sense transformer 425 will cause a magnetic flux to be created about the sense transformer 425. The magnetic flux results in electrical current being induced on conductor 530. The induced current on conductor 530 causes a voltage difference between the V-REF and INPUT pins. When the voltage difference exceeds a predetermined threshold, the detection controller 515 outputs the control signal from the SCR_OUT pin. The control signal may then be detected at node 575 via pin GP1 of the self-test controller 550. Once the control signal exceed the predetermined voltage (e.g., 190 mV), the ground fault signal is deactivated and it is determined by the self-test controller 550 that the GFCI receptacle 10 has passed the ground fault detection self-test. If the control signal does not exceed the predetermined voltage (e.g., approximately 190 mV) within the predetermined duration (e.g., approximately eight-milliseconds) discussed above, the self-test controller 550 determines that the GFCI receptacle 10 has failed, and the GFCI receptacle 10 will be retested in a similar fashion as discussed above.

Solenoid Self-Test

The self-test controller 550 is further operable to perform a solenoid self-test. In some embodiments, the solenoid self-test is performed within a predetermined time of the GFCI receptacle 10 receiving power (e.g., approximately five seconds). The solenoid self-test confirms that the GFCI receptacle 10, and more specifically the solenoid 520, is operating correctly. The solenoid self-test may also be performed at a predetermined period (e.g., once every minute). In some embodiments, the solenoid self-test is performed at a predetermined time period (e.g., approximately thirty-seconds) after the ground fault self-test is performed. In such an embodiment, the ground fault self-test or the solenoid self-test occurs every thirty-seconds. Similar to the ground fault self-test, if the solenoid self-test is failed, a retest is performed, for example but not limited to, two-seconds later. Retests will occur until the solenoid self-test is passed or seven additional failures have occurred. If eight consecutive fails occur, the GFCI receptacle 10 EOL will be determined. In other embodiments, EOL may be determined if more or less than eight consecutive fails occur. Yet, in other embodiments, EOL may be determined if more or less than eight non-consecutive fails occur.

To perform the solenoid self-test, the self-test controller 550 initially measures the frequency of the input voltage as described above. After calculating the frequency of the input voltage, the self-test controller 550 outputs a solenoid test signal at a second predetermined period (e.g., $9/16^{th}$) of the frequency of the input voltage after the input voltage has crossed the positive zero (i.e., during the negative half-cycle of the input voltage). However, in some embodiments, the solenoid self-test may be performed at the same predetermined period as the ground fault detection self-test.

The solenoid test signal is output from the GP1 pin and is received by the solenoid switch 525 (e.g., at the gate of the solenoid switch 525). The solenoid test signal activates the solenoid switch 525, thus allowing current to flow through the solenoid 520. Current flowing through the solenoid 520 may then be detected at node 570 via the GP2/INT pin of the self-test controller 550. If current is detected, the solenoid self-test has been passed and output of the solenoid test signal is stopped. If current is not detected, the solenoid self-test has failed. In such an embodiment, the GFCI receptacle 10 will not be tripped during the solenoid self-test because the solenoid self-test is performed during the negative half-cycle of the input voltage.

The self-test controller 550 is further operable to determine when the GFCI receptacle 10 is in a tripped condition and activate indicator 567 (e.g., a light-emitting diode (LED) located in opening 30 or 33 of FIG. 1) when in the tripped condition. In operation, the self-test controller 550 monitors activation of the opto-isolator 560 via the GP4 pin. The opto-isolator 560 is in an active state when current is present on conductors 445, 450. When the opto-isolator 560 is active, the self-test controller 550 deactivates the indicator 567. When current is not present on conductors 445, 450, the GFCI receptacle 10 is in the tripped condition and the opto-isolator 560 is in an inactive state. When the opto-isolator 560 is in the inactive state, the self-test controller 550 will activate the indicator 567 by outputting an activation signal at pin GP5. In some embodiments, the activation signal is output at a predetermined rate (e.g., a rate of 250 Hz). In such an embodiment, the predetermined rate is fast enough that the indicator 567 appears to be in a constant on-state to the user, while also conserving power.

The self-test controller 550 may further includes a buzzer circuit 600. In such an embodiment, the buzzer circuit 600 is configured to output a signal (e.g., an auditory signal) when the GFCI receptacle 10 is in a tripped condition. The buzzer circuit 600 includes, among other things, a buzzer 605 and a buzzer switch 610. The buzzer 605 is electrically connected to, and configured to receive power from, the phase line terminal 405. The buzzer 605 is further connected to ground through the buzzer switch 610. In operation, when the indicator 567 is activated (i.e., the activation signal is output from pin GP5), the buzzer switch 610 is also activated, thus allowing power to the buzzer and activating the buzzer 605. Similar to the indicator 567, in some embodiments, when activated, the buzzer 605, is switched on and off at a predetermined rate (e.g., a rate of 250 Hz). In such an embodiment, the predetermined rate is fast enough that the buzzer 605 appears to be in a constant on-state to the user, while also conserving power. In some embodiments, the indicator 567 and buzzer 605 are disabled when the input voltage crosses a predetermined threshold (for example, a predetermined threshold of approximately 155 VAC to approximately 160 VAC). In some embodiments the indicator 567 and buzzer 605 are disabled when the input voltage is above approximately 160 VAC and enabled when the input voltage is below approximately 155 VAC.

In some embodiments, the buzzer circuit 600 further includes rectifier diode XD1; resistors XR2, XR3, and XR4; zener diodes XZ1 and XZ2, and capacitor XC2. In such an embodiment, the rectifier diode XD1 provides a half-wave rectification to the buzzer 605, while the resistors XR2, XR3, and XR4 limit current to the buzzer 605. Additionally, in such an embodiment, Zener diodes XZ1 and XZ2 provide a voltage drop to set the buzzer voltage and capacitor XC2 filters the buzzer voltage.

The self-test controller 550 is further operable to deny power to the load and face. In some embodiments, power is denied when EOL is determined. In operation, when EOL is determined, the self-test controller 550 outputs an EOL signal from the GP1 pin to the solenoid switch 525. The value of resistor R5 (i.e., the resistor connected between the GP1 pin and the solenoid switch 525) is selectively chosen to ensure that the voltage received by the solenoid switch 525 does not reach an "ON" threshold voltage and activate the solenoid switch 525. Thus, the solenoid switch 525 is permanently maintained in the OFF position (e.g., deactivated) and the GFCI receptacle 10 is not allowed to be reset out of the tripped condition. Such an operation inhibits any further resets (via the RESET button 24) from triggering the solenoid switch 525 and thus latching the contacts closed when in the GFCI receptacle 10 is in the tripped condition. In some embodiments, when EOL is determined, the indicator 567 and the buzzer 605 are switched on and off at a second predetermined rate (e.g., 2 Hz). In some embodiments, the second predetermined rate causes the user to experience the indicator 567 as flashing and the buzzer 605 as pulsing on and off.

Figure 5:
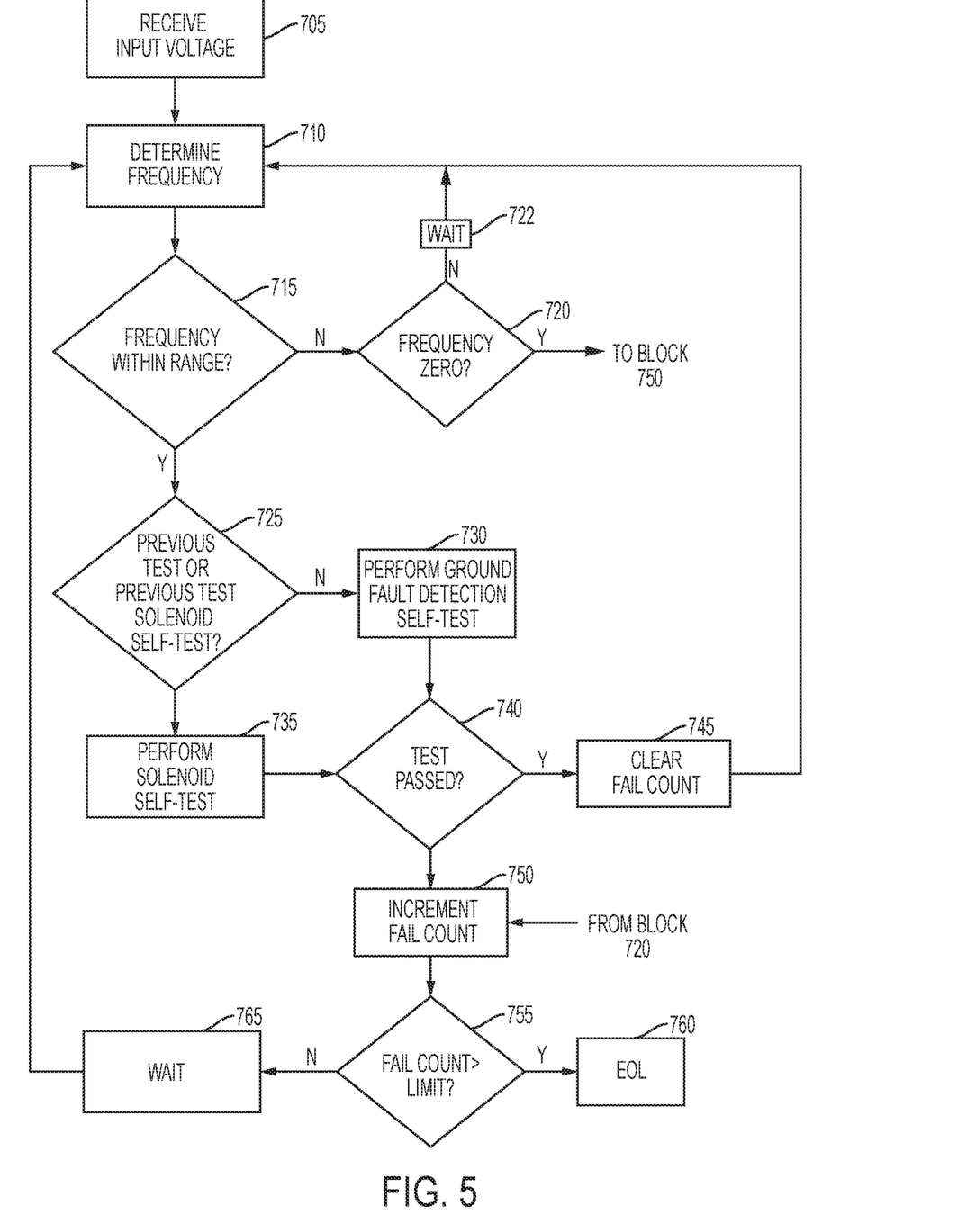
FIG. 5 is a flow chart illustrating a method, or operation, of the GFCI receptacle of FIG. 1, according to some embodiments of the application.

FIG. 5 is a flow chart illustrating a method, or operation, 700 of the GFCI receptacle 10 in accordance with some embodiments of the application. The GFCI receptacle 10 initially receives input voltage through the phase line terminal 405 and neutral line terminal 410 (Block 705). The GFCI receptacle 10 determines an input frequency of the input voltage (Block 710). The GFCI receptacle 10 determines if the input frequency is within a predetermined frequency range (Block 715). If the input frequency is not within the predetermined frequency range, the GFCI receptacle 10 determines if the input frequency is equal to zero (Block 720). If the input frequency is equal to zero, the method 700 proceeds directly to Block 750. If the input frequency is not equal to zero, the GFCI receptacle 10 waits a predetermined time period (e.g., two-seconds) (Block 722) and then proceeds to Block 710 to once again determine the input frequency.

If the input frequency is determined to be within the predetermined frequency, the method 700 continues to Block 725. At Block 725, the GFCI receptacle 10 determines if there has not been a previous test, or if the previous test performed was the solenoid self-test. If there has not been a previous test, or if the previous test performed was the solenoid self-test, the GFCI receptacle 10 will perform the ground fault detection self-test (Block 730). If there was a previous test and it was not the solenoid self-test, the previous test was therefore the ground fault detection self-test, and the GFCI receptacle 10 will next perform the solenoid self-test (Block 735). The GFCI receptacle 10 then determines if the previous test performed has passed (Block 740). If the previously-performed self-test has passed, a fail count is cleared (Block 745) and the method 700 reverts back to Block 710. If the previously-performed self-test did not pass, the fail count is incremented (Block 750). The GFCI receptacle 10 next determines if the fail count has surpassed a fail count limit (e.g., seven) (Block 755). If the fail count has surpassed the fail count limit, EOL is determined (Block 760). If the fail count has not surpassed the fail count limit, the GFCI receptacle 10 waits a predetermined amount of time (e.g., two-seconds) (Block 765). The method 700 then returns to Block 710.

Figure 6:
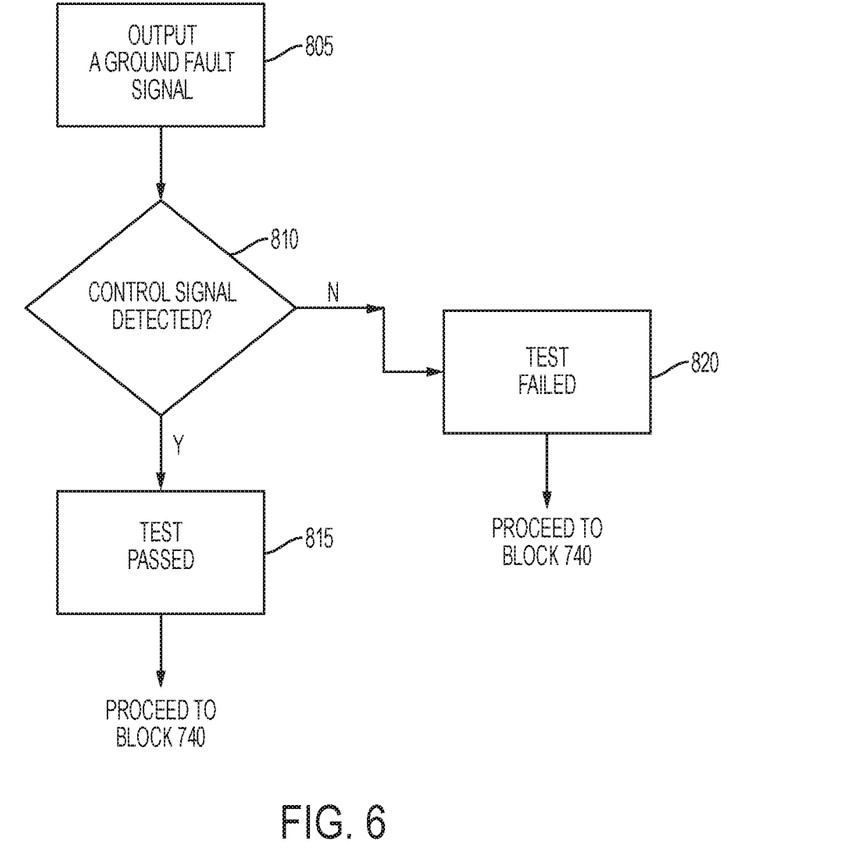
FIG. 6 is a flow chart illustrating one embodiment of a ground fault detection self-test of the GFCI receptacle of FIG. 1, according to some embodiments of the application.

FIG. 6 is a flow chart illustrating a method 800 of the ground fault detection self-test in accordance with some embodiments of the application. The ground fault signal is output from by the self-test controller 550 (Block 805). The self-test controller 550 determines if a control signal output by the detection controller 515 is detected within a predetermined time period after outputting the ground fault signal (Block 810). If the control signal is detected within the predetermined time period, the test is passed (Block 815) and the operation proceeds to Block 740 of method 700. If the control signal is not detected, the test is failed (Block 820) and the operation proceeds to Block 740 of method 700.

Figure 7:
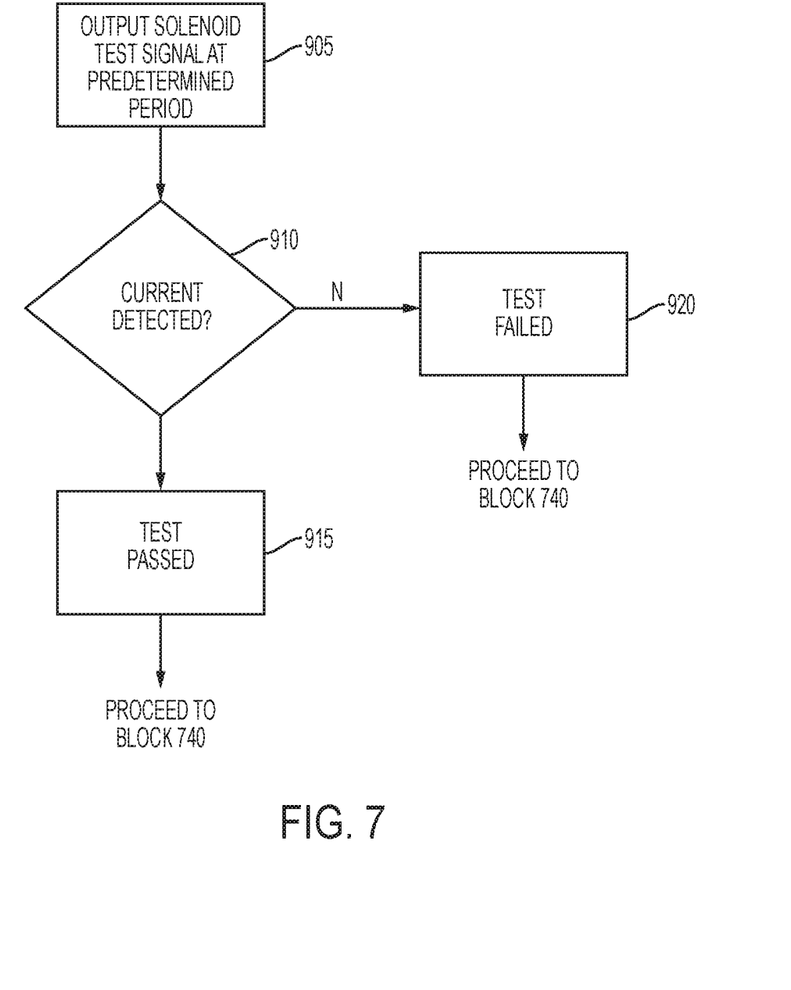
FIG. 7 is a flow chart illustrating one embodiment of a solenoid self-test of the GFCI receptacle of FIG. 1, according to some embodiments of the application.

FIG. 7 is a flow chart illustrating a method 900 of the solenoid self-test in accordance with some embodiments of the application. The solenoid test signal is output from by the self-test controller 550 (Block 905). The self-test controller 550 determines if a solenoid current is detected (Block 910). If the solenoid current is detected, the test is passed (Block 915) and the operation proceeds to Block 740 of method 700. If the solenoid current is not detected, the test is failed (Block 920) and the operation proceeds to Block 740 of method 700.

Thus, the application provides, among other things, a GFCI receptacle that detects a frequency of the input voltage and uses the detected frequency to determine when self-testing is performed. As a result of performing self-testing in such a manner, embodiments of the GFCI receptacle may be used in conjunction with voltage sources that have varying voltage frequency, such as but not limited to, power generators and power inventors or the like. Various features and advantages of the application are set forth in the following claims.

What is claimed is:

1. A wiring device comprising:
    an interrupting device electrically connecting one or more line terminals to one or more load terminals when the interrupting device is in a reset condition and disconnecting the line terminals from the load terminals when the interrupting device is in a tripped condition;
    a fault detection circuit configured to detect a fault condition and generate a fault detection signal in response to detecting the fault condition, the fault detection signal being provided to the interrupting device to place the interrupting device in the tripped condition; and
    a testing circuit configured to,
        determine a frequency of an input voltage at the one or more line terminals,
        filter the frequency of the input voltage,
        determine whether the filtered frequency is within a predetermined range, and
        when the filtered frequency is within the predetermined range, perform a test of the wiring device.

2. The wiring device of claim 1, wherein the test is at least one selected from a group consisting of a first test of the interrupting device at a first period of the frequency, and a second test of the fault detection circuit at a second period of the frequency.

3. The wiring device of claim 2, wherein the first period and the second period are respectively located at a negative half-wave of the frequency.

4. The wiring device of claim 2, wherein the first period of the frequency and the second period of the frequency are equal.

5. The wiring device of claim 1, wherein the interrupting device includes a solenoid and a solenoid switch.

6. The wiring device of claim 5, wherein the first test includes the steps of
outputting a control signal to activate the solenoid switch; and
measuring a current of the solenoid when the control signal is output.

7. The wiring device of claim 1, wherein the fault detection circuit includes a transformer and a detection controller.

8. The wiring device of claim 7, wherein the second test includes the steps of
outputting a control signal to allow current to flow through the transformer; and
measuring an output of the detection controller when current is flowing through the transformer.

9. The wiring device of claim 1, wherein determining the frequency includes counting the number of positive zero crossings of the input voltage over a predetermined time period.

10. The wiring device of claim 1, wherein filtering the frequency of the line voltage includes a low-pass filtering operation to remove noise.

11. A method of performing a self-test of a wiring device, the method including:
determining a frequency of an input voltage;
filtering the frequency of the input voltage;
determining whether the filtered frequency of the input voltage is within a predetermined range; and
when the filtered frequency is within the predetermined range, performing the self-test of the wiring device.

12. The method of claim 11, wherein the self-test includes at least one selected from a group consisting of a first test of an interrupting device of the wiring device at a first period of the frequency, and a second test of a fault detection circuit of the wiring device at a second period of the frequency.

13. The method of claim 12, wherein the first period and the second period are respectively located at a negative half-wave of the frequency.

14. The method of claim 12, wherein the first period of the frequency and the second period of the frequency are equal.

15. The method of claim 11, wherein filtering the frequency of the line voltage includes a low-pass filtering operation to remove noise.

16. The method of claim 11, wherein the step of performing the first test includes
outputting a control signal to activate a solenoid switch; and
measuring a current of a solenoid when the control signal is output.

17. The method of claim 11, wherein the step of performing the second test includes
outputting a control signal to allow current to flow through a transformer; and
measuring an output of the fault detection circuit when current is flowing through the transformer.

18. The method of claim 14, further comprising determining end-of-life of the wiring device if at least one selected from the group consisting of the first test and the second test have failed a predetermined number of times.

19. The method of claim 18, wherein the step of determining the frequency of the input voltage includes counting the number of positive zero crossings of the input voltage over a predetermined time period.

20. The method of claim 11, further comprising switching a buzzer on and off at a predetermined rate when a fault is detected.

* * * * *